Oct. 1, 1940.  A. C. HOMEYER  2,216,531

VALVE

Filed Feb. 8, 1938

INVENTOR
Arthur C. Homeyer
BY
Henry J. Lucke
HIS ATTORNEY

Patented Oct. 1, 1940

2,216,531

UNITED STATES PATENT OFFICE 2,216,531

VALVE

Arthur C. Homeyer, Glen Ridge, N. J.

Application February 8, 1938, Serial No. 189,290

12 Claims. (Cl. 251—125)

This invention relates to automatic control valves, and particularly to valves in which the flow of fluid therethrough is to be regulated primarily by temperature or pressure conditions at a point remote from the valve.

The invention is particularly adaptable to valves employed in controlling the feed of fuel-gas to an automatic gas heated refrigerator, in which, as is well known, a soluble gas is caused to dissolve in water, the solution heated in a boiler section of the apparatus, and the gas driven off under pressure by such heating being subsequently liquified by cooling. Upon vaporization and expansion of the liquified gas in suitable expansion or "cooling" coils in the refrigerator, the gas is reabsorbed by the water and the cycle repeated. The degree of cooling is regulated, and a predetermined temperature maintained in the refrigerator compartment by controlling the rate at which the soluble gas is driven out of solution, i. e., by regulating the size of the gas flame heating the boiler section.

Valves for the control of such gas flame, said valves additionally providing for the absolute shutting off of the flame when the pressure in the boiler exceeds a safe maximum, are well known in the art, and per se do not form the subject matter of the present invention.

The present invention relates to a valve embodying an improved valve disc assembly, and presents a novel arrangement of the valve disc and its therewith associated actuating structure.

A feature of the present invention is the provision of a valve disc which has a comparatively great degree of self-adjustability with respect to its associated valve seat, such self-adjustability insuring a tight closure of the valve, despite warping or other shifting of the plane of the valve seat with respect to a previous plane of the valve disc. Additionally, the self-adjustability afforded by the present invention insures that the valve disc means comes into correct operative relationship with the stated valve seat on the next operating cycle of the refrigerator even after a severe derangement of said valve disc through jarring the mechanism, as in the circumstance of slamming the refrigerator door, or by rough handling during the transportation of the refrigerator.

In this invention, the disc is arranged to close the valve seat completely, when necessary to prevent gas flow, through the agency of a flexible steel spring biased to urge the valve disc against its seat. The valve spring-member moves the valve disc away from, or in closing relationship to, the valve seat in following the expansion or contraction of a metal bellows under the influence of a thermostatic bulb suitably located within the refrigerator. The connection between the valve spring and the bellows is desirably a slidable pin of limited sectional area, accurately guided, and disassociated from the bellows or the valve spring-member. By providing for a positive guide of such actuating element, and by making it freely movable with respect to the bellows and spring, the present invention achieves the desideratum of having the valve spring-member flexed uniformly by the action of the bellows.

It is thus a primary object of the invention to provide means of regulating flow of fluid under primary dictation of external temperature or pressure condition, in a manner which insures, for each repetition of such external temperature or pressure condition, a substantially identical positioning of a valve disc with respect to its seat, regardless of possible non-symmetric expansion of the actuating bellows, shifting of the plane of the valve seat with respect to the valve disc, or accidental derangement of the valve disc.

Other features and advantages will hereinafter appear.

In the accompanying drawing—

Figure 5:
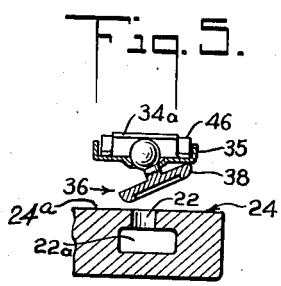
Figure 4:
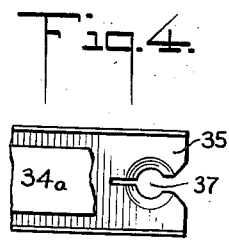
Figure 6:
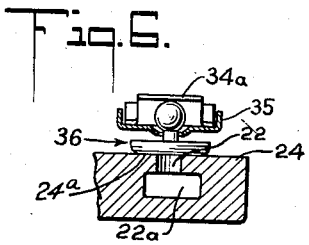

Fig. 4 is an enlarged plan view of a portion of the valve-disc supporting means, particularizing the preferred ball socket seat for the valve disc member; and Figs. 5 and 6 are sectional elevations, enlarged, of the valve disc and supporting means and the valve seat structure of the valve, Fig. 5 particularizing an extreme derangement of the valve disc and thus indicating the wide degree of self-adjustability of the valve disc; Fig. 6 indicating the valve disc having been brought to valve closing position against the valve seat.

Figure 1:
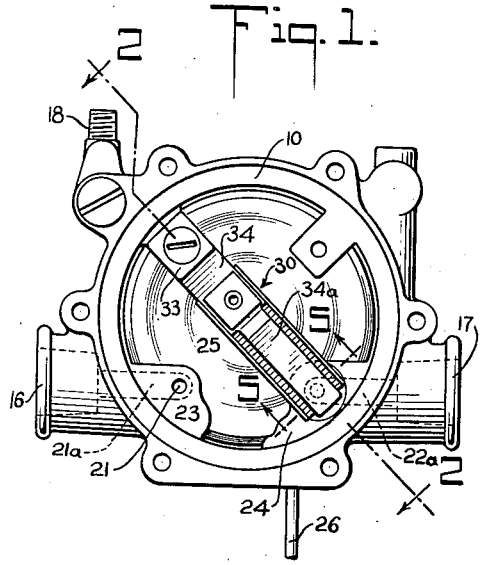
Fig. 1 is a plan view of a valve embodying the present invention, cover means of such valve having been removed to reveal the inner structure thereof.
Figure 2:
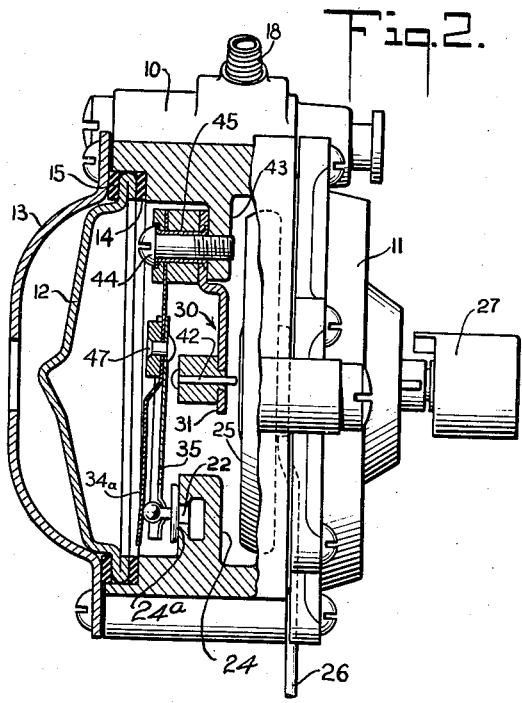
Fig. 2 is an enlarged elevation, partly in section along the lines 2—2 of the valve of Fig. 1, showing a valve port having been closed by the structure of the present invention.

Referring to the drawing, a control valve represented in Figs. 1 and 2 includes a chamber 10, made fluid-tight by removable cover plates 11, 12, 13, with which may be employed suitable gasket means 14 and 15. Fluid inlet and outlet conduit connections, respectively 16 and 17, provide for the admission and exit of gas or other fluid. The particular embodiment of control valve shown is adaptable for use in the control of a refrigerating unit of the automatic gas-burning type, and 17 may therefore represent a point of connection with piping leading to the burner of the refrigerator generator. A by-pass connection 18, connecting with the interior of the chamber 10 by a suitable passage (not shown), provides for a minimum flame condition at the burner regardless of flow of gas through 17, as later described. Suitable means may provide for the manual regulation of flow through such by-pass.

The points of communication of the conduit connections 16, 17, with the chamber 10, may be through orifices 21, 22 drilled into bosses 23, 24 having, as shown, suitable passages 21a, 22a, communicating with their respective conduit connection points. The surface of either or both of said bosses may be suitably machined to serve as a valve seat; in the embodiment illustrated, boss 24 is so machined. The valve seat is designated 24a.

The control valve in its illustrated embodiment may have an expansible bellows 25 or equivalent structure, having a capillary tube 26 communicating with the interior thereof. Such capillary tube may terminate in a pressure connection, or the tube and a temperature-sensitive bulb (not shown) may, with the bellows 25, form a temperature-sensitive system, in the operation of which the bellows 25 is distended or collapsed by internal pressure generated by the expansion or contraction of suitable liquid filling the system, or by vapor-pressure generated by a volatile fluid within the bulb. Adjustment means including the knob 27 may be provided to move the bellows 25 axially within the casing 10, for control-point setting purposes, as later described.

Figure 3:
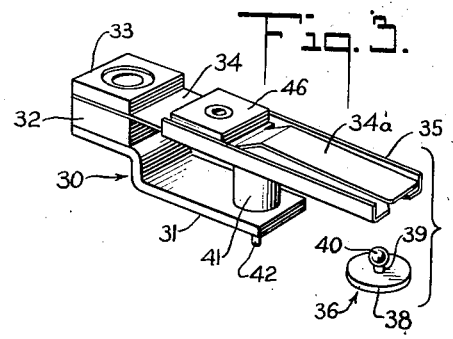
Fig. 3 is a perspective of the valve disc spring member and valve disc, the latter being out of normal position for the purpose of illustration.

Referring now to Figures 2 and 3, the control valve includes a novel valve unit 30, arranged to shut off or throttle gas flow through the orifice 22 and thence through the connection 17, under the dictation of the bellows 25. The valve unit 30 preferably comprises a rigid base structure 31, advantageously a suitably configured rigid metal tongue, a spacer block 32 being preferably secured to said tongue and forming, with a cap 33, clamping means for the securement of a spring, desirably a leaf spring 34. Leaf spring 34, as clearly appearing in Fig. 2, has a forward extension 34a, and intermediate the cap 33 and the portion 34a of the leaf spring, there is preferably permanently secured, as by riveting or similar means, a valve disc supporting member 35. As appears in Figs. 3 and 4, the member 35 is disposed beneath the spring member 34, and has upwardly turned flanges disposed clearably at each side of the forward portion 34a of the leaf spring. Thus, leaf spring element 34a has free vertical movement with respect to the member 35.

A valve disc 36 is arranged to be swivelly carried by the member 35. To effect such swivel carriage, the terminal end of the member 35 may be bifurcated, as shown in Fig. 4, and formed with a suitable downwardly directed socket-like depression 37. For cooperation with such socket, the valve disc 36 may have suitably spaced from its body 38 by a neck 39, a substantially spherical head 40. The extent of such spacing, as will be obvious, determines the degree of swinging movement of the valve disc 36 with respect to the underside of the member 35.

In conformity with its function as a valve disc, the underside of the body 38 is suitably faced to cooperate with the machined valve seat 24a of the boss 24, to effect a fluid-sealing engagement therewith. Desirably, the peripheral surface of the valve disc body 38 is rounded or suitably beveled.

The terminal opening of the socket 37 is preferably slightly smaller than the diameter of the neck 39 of the valve disc 36, thus providing for snapping the valve disc 36 into its socket-supported position, and thereby insuring against the accidental endwise displacement of the valve disc. In normal position of the valve disc 36, by such "normal" position being meant the support of the valve disc above the surface of the boss 24, the head 40 of the valve disc is urged into engagement with the upper surface of the socket 37 by the pressure of the spring element 34a thereon, it being apparent from Fig. 3 that such element 34a slopes downwardly toward the forward end of the member 35 and thus is biased downwardly in that direction. The pressure exerted by the spring element 34a against the upper surface of the head 40 is not, however, sufficient to rob the valve disc 36 of its freely swivelling characteristic.

Further, the valve member 30 includes a guide means 41, preferably permanently secured to the base member 31 near the forward end thereof. The guide 41 may be a cylindrical block, suitably drilled to permit slidable movement of a pin 42 therein. As shown in Fig. 2, the pin 42 may have a button-like head disposed approximately centrally between the spacing block 32 and the boss 24. The opposite end of the pin 42, preferably rounded, is disposed adjacent the central point of the bellows 25, the expansion of such bellows urging the head of the pin against the underside of the disc supporting member 35.

The entire valve disc assembly 30, may be secured to a suitable boss 43 formed in the chamber 10, as by a machine screw 44. Definite advantages accrue from so establishing the thickness of the spacing block 32 that it, additive to the thickness of the member 31, positions the leaf spring 34 slightly above the surface of the boss 24, and, additionally, substantially parallel to such surface when the disc 36 is in valve-closing position. The leaf spring 34 is preferably biased downwardly in the direction of the boss 24, thereby tending to urge the supporting element 35 and the therewith associated valve disc 36 always into flow-preventing contact with the surface of the boss 24. By so positioning the leaf spring slightly above the boss 24, the metallic structure of the leaf spring 34 may be substantially uniform and not locally deformed, as would be the condition were the spring 34 secured directly to the boss 43 and bent upwardly into correct operative relationship. The metallic structure of the spring 34 thus being substantially in repose, the upward flexing of the spring 34, under the urging of the pin 42, does not severely strain it. It is an additional advantage to secure the spring 34 between the spacing block 32 and the cap 33 in a manner which makes the tension of the spring 34 entirely independent of the degree of tightening the machine screw 44 serving to hold the assembly 30 in position. Such securement of the spring may be effected by providing a sleeve or liner 45, such liner having its ends upset to form flanges, as shown in Fig. 2, and thereby serving an additional function as a rivet.

As is indicated in Figs. 2 and 3, the means of securing the member 35 to the underside of the spring 34 may advantageously comprise a non-circular block 46, such block having preferably flat side surfaces which are engageable by the upward flanges of the member 35, to prevent the independent rotation of such member 35 with respect to block 46. A rivet 47, as indicated in Fig. 2, may pass through the block, spring 34, and element 35 to integrate the assembly. A structural and functional advantage accrues from such mounting of the member 35, namely that it makes the rear portion of the leaf spring 34 functionally distinct from the forward portion 34a thereof. Consequently, the element 35 may be urged in the direction of the boss 24 solely by the rear portion of the leaf spring 34, the forward portion 34a performing a dual and independent function of maintaining the ball in contact with its socket 37, as previously described, and further exerting a positive pressure against the head 40 of the valve disc 36 serving, under conditions when the valve disc 36 is in full flow-preventing contact with valve seat 24a, to maintain such valve disc contact.

In the normal operation of the control valve, such for example, as in the regulation of the gas flame of the generator of a refrigerator unit, the temperature adjustment knob 27 is rotated, to position the surface of the bellows 25 in greater or less proximity to the end of the pin 42, thus making a less or greater expansion of the bellows necessary to cause movement of the pin in the direction of the valve disc assembly 30. Assuming the temperature of the refrigerator to be above the desired control point, the pressure within the temperature control system 25, 26 causes a suitable expansion of the bellows 25, and through the action of the pin 42 pressing against the underside of the member 35, swings the valve disc 36 away from the valve seat 24a, permitting an increased volume of gas to flow to the burner of the refrigerator unit. The resultant increased size of the gas flame causes a greater evaporation of the refrigerant at the boiler and a corresponding cooling of the refrigerator and reduction of the temperature of the sensitive bulb, generally located adjacent the evaporator unit. The reduction in pressure within the bellows 25 causes a certain degree of collapse thereof and permits the normal bias of the spring element 34 to bring the valve disc 36 into closer proximity to the valve seat 24a. Such movement of the valve disc throttles flow of gas to the burner and the rate of cooling of the refrigerator unit is lessened. Should the temperature at the thermostatic bulb continue to fall, continued collapse of the bellows 25 may result in the complete disengagement of the surface of the bellows from the adjacent end of the pin 42, and permit the leaf spring 34 to urge the valve disc into full flow-preventing contact with the valve seat. As the full force of the bias of spring 34 may not be spent when the valve disc comes initially into contact with the valve seat 24a, the valve disc supporting member 35 may continue to approach the valve seat 24a, freeing the head 40 from contact with the surface of the socket 37. On such movement of the member 35, induced by the spring 34, the spring 34a becomes effective to press the disc 36 against the valve seat 24a with a positive, yielding pressure. Expansion of the bellows 25, causing the pin 42 to press against the underside of the member 35, serves initially to swing the member clockwise of Fig. 2 against the pressure of spring 34a until the surface of the socket has contacted the underside of the ball 40 and is effective to start to move the disc 36 away from the seat 24a. Under such circumstances, which is illustrated in Fig. 5, the spring 34a serves to hold the underside of the sphere 40 in the socket 37.

The housing 10 of such control valves is commonly die-cast. As is known, die-castings may warp at any time after they have been made, and warping may take place after the machining of the boss 24 to form the valve seat. In valve disc assemblies which do not provide for free self-adjustability of the valve disc with respect to the surface of the valve seat 24a, a condition results wherein the valve 36 does not seat tightly against the valve seat. In the valve disc assembly above described, the relatively great degree of self-adjustability afforded by the full ball and socket carriage of the valve disc permits the stated disc to adjust itself to the plane of the valve seat 24a, and to maintain such adjustment.

A further disadvantage of existing valve disc structures, is that they may be brought appreciably out of alignment with valve seat 24a by jarring the control valve when the disc is in raised position, especially during the shipping or other handling of the refrigerator during an inoperative stage, in which stage the valve disc would be raised above the seat 24a to the full extent permitted by its mounting. Such a condition has been diagrammatically illustrated in Fig. 5, which shows the valve disc sharply inclined with respect to the seat 24a. In structures not affording the full degree of adjustability provided by the present invention the valve disc 36 may assume a set position which the strength of the spring member 34 or its equivalent may not be sufficient immediately to overcome. Under such circumstance, the refrigerator would pass through numerous refrigerating cycles before the desired temperature control was obtained. In the valve disc assembly of the present invention, the extreme flexibility of the swivel mounting of the valve disc 36 in the carrying member 35 permits an immediate self-adjustment of the disc 36 with respect to the valve seat 24a, such self-adjustment being aided by the curvature or bevel of the peripheral surface of the valve disc, but primarily effected by the relatively frictionless contact of the ball member 40 with the socket 37 and with the spring member 34a. The refrigerator control will thereby function in the desired manner after one cycling of the refrigerator process.

It is to be noted that the pin 42, being extirely disassociated from either the bellows 25 or the valve disc supporting structure 30, and positively guided with respect to the latter, presses against the valve member 35 at an exact location regardless of whether or not the bellows 25 expands symmetrically. Irregular movement of the bellows, the effect of such irregularity being at a minimum at the center of the bellows, is therefore not effective to cause variant movement of the valve disc 36 for the same degree of temperature change at the thermostatic bulb, and repetition of the setting point of the refrigerator through continuous cycling of the refrigerator is substantially assured.

Whereas I have described my invention by reference to specific forms thereof, it will be understood that many changes and modifications may be made without departing from the spirit of the invention.

I claim:

1. As an article of manufacture, a valve disc supporting and actuating structure comprising, in combination, a base, a leaf spring supported in spaced relationship therewith and substantially parallel thereto, a valve disc supporting element secured to said leaf spring, a valve disc swivelly mounted at an end of said supporting element and at a point remote from said base, a valve-spring actuating member arranged to bear against said spring, and guide means for maintaining the slidable movement of said actuating member in a direction substantially vertical to said valve disc supporting element.

2. As an article of manufacture, a valve disc supporting structure comprising, in combination, a substantially unyielding base, a leaf spring supported in spaced relationship therewith, a valve disc supporting element secured to said spring and forming a continuation thereof, said supporting element having a bifurcated socket portion at the unsecured end thereof, a valve disc having a body portion and a spherical head portion supported in spaced relationship thereto, said head portion being adaptable for seating in said socket, whereby the body portion of said disc may be suspended from the said supporting element in a manner permitting the substantially free swivel thereof, a spring arranged yieldably to urge said head portion into contact with said socket, and piston means arranged to cause a movement of the said leaf spring on the application of force at an end of said piston means.

3. An article of manufacture as set forth in claim 2, wherein the said leaf spring is supported in substantial parallelism with said base.

4. An article of manufacture as set forth in claim 2, wherein the said leaf spring is permanently secured to said base.

5. An article of manufacture as set forth in claim 2, wherein the said leaf spring is permanently secured to said base by hollow rivet means providing for the passage of means for securing said article to a valve body.

6. An article of manufacture as set forth in claim 2, wherein the spring arranged to bear against the said spherical head portion is a continuation of the said leaf spring.

7. An article of manufacture as set forth in claim 2, wherein the said piston means is guided for motion by the said base portion.

8. An article of manufacture as set forth in claim 2, wherein the said piston means is positively guided with respect to said leaf spring.

9. In a control valve, the combination with a chamber provided with valve seat means, of means arranged to be disposed with respect to said valve seat to control flow therethrough, said means including a spring fixedly mounted within said chamber, a valve disc having a substantially spherical head portion, socket means associated with said spring for swivelly supporting said valve disc by its head portion, said socket means disposing said valve disc in operative relation with said valve seat, and means for resiliently holding said head portion within said socket.

10. In a control valve, the combination with a chamber provided with valve seat means, of means arranged to be disposed with respect to said valve seat to control flow therethrough, said means including a spring fixedly mounted within said chamber, a valve disc having a substantially flat body and a substantially spherical head portion disposed remote from said body, socket means associated with said spring and arranged to support said valve disc intermediate its head and body portions, and means comprising a leaf spring operatively associated with said socket means for resiliently holding said valve disc within said socket.

11. A control valve, including the combination with a chamber having a valve port and valve seat means therefor, of valve closure means comprising a cantilever spring unit arranged to be anchored to said chamber and having a free end disposed above said valve seat, a valve disc having a substantially flat body and a substantially spherical head disposed remote from said body, means for supporting said valve disc at the free end of said spring unit by engagement of the spherical head of said valve disc, said supporting means including a bifurcated socket for the reception of said spherical head at a lower portion thereof, and means for resiliently urging said spherical head into contact with said socket.

12. A valve, comprising the combination with a chamber having a valve port and valve seat means therefor, of means including a supporting member for a valve disc, spring means operatively associated with said supporting member and urging the same toward said seat means, a valve disc having a body portion and a spindle terminating in a spherical head by which said valve disc is swivelly carried by said supporting member, spring means for urging said head into engagement with said supporting member, and pin means operatively associated with said supporting member and arranged for movement with respect thereto to effect movement of said supporting member in direction away from said seat means.

ARTHUR C. HOMEYER.